United States Patent [19]
Lancaster

[11] Patent Number: 4,741,255
[45] Date of Patent: May 3, 1988

[54] FLUID FLOW DISTRIBUTION DUCTS

[75] Inventor: David H. Lancaster, Woodford, United Kingdom

[73] Assignee: British Aerospace PLC, London, England

[21] Appl. No.: 927,022

[22] Filed: Nov. 5, 1986

[30] Foreign Application Priority Data

Nov. 5, 1985 [GB] United Kingdom ............... 8527201

[51] Int. Cl.[4] ............................................. F24F 13/02
[52] U.S. Cl. ............................................. 98/1; 98/1.5; 137/561 A; 138/117; 138/DIG. 4
[58] Field of Search .......................... 98/1, 1.5, 40.01; 244/118.5, 207; 138/111, 115, 116, 117, DIG. 4; 137/561 A, 561 R, 597

[56] References Cited

U.S. PATENT DOCUMENTS

| | | | |
|---|---|---|---|
| 2,912,189 | 11/1959 | Povit | 244/207 |
| 3,262,659 | 7/1966 | Copeland | 244/207 |
| 3,432,123 | 3/1969 | Conway et al. | 244/207 |
| 3,711,044 | 1/1973 | Matulich | 244/118.5 |
| 3,802,825 | 4/1974 | Upmeter | 137/561 A |
| 4,546,939 | 10/1985 | Cronin | 244/118.5 |

*Primary Examiner*—Larry I. Schwartz
*Attorney, Agent, or Firm*—Cushman, Darby & Cushman

[57] ABSTRACT

A fluid flow distribution duct for receiving temperature controlled air from duplicated Environmental Control System units in an aircraft air conditioning system and providing balanced distribution of the respective air flows to port and starboard sides of the aircraft cabin. The invention provides efficient separation and distribution of the respective flows, flow mixing occurring at or about the cabin inlet position. By this arrangement, the need for flow mixing chambers obviated giving a more efficient flow and compact duct arrangement than hitherto.

6 Claims, 2 Drawing Sheets

FLUID FLOW DISTRIBUTION DUCTS

This invention relates to fluid flow distribution ducts. Primarily, though not exclusively, it relates to fluid flow distribution ducts for use in aircraft air conditioning systems.

In aircraft air conditioning systems, and particularly those of passenger transport aircraft, there is a requirement to provide air at one temperature to the cockpit or flight deck and at another temperature to the passenger cabin since, for numerous reasons, the two demands may be significantly different. Furthermore, the temperature and pressure distribution to the cabin must, to a substantial degree, be equally distributed between the port and starboard sides of the aircraft. To achieve this end it is usual to provide duplicated Environmental Control System (ECS) units for the supply of temperature regulated air. Fluid flow from a first ECS unit will supply initially at least a portion of its output to the cockpit or flight deck, the residual flow being available for cabin conditioning whereas the total output from a second ECS will be available for that latter purpose. In known systems, to ensure balanced distribution to port and starboard sides of the cabin the flows, residual and total flow, from the respective ECS units pass to a cross-over duct arrangement incorporating mixing chamber means within which the flows are mixed and subsequently ducted in balanced quantities to port and starboard cabin inlets.

However, the complexity of these known cross-over duct arrangements comprising input flow duct means, mixing plenum chamber means and resultant flow dispersal means may result in undesirable pressure losses but furthermore may be excessively wasteful in the installed space within the aircraft equipment bay where space is at a premium. It is the object of the present invention to overcome these shortcomings.

According to one aspect of the present invention there is provided a fluid flow distribution duct for an aircraft air-conditioning system comprising first air inlet duct means for receiving air from a first air supply source, second air inlet duct means for receiving air from a second air supply source, said first and second air inlet duct means including air inlet flow dividing means forming first and second fluid flow passageway means of substantially equal cross-sectional area for communicating with first and second air outlet duct means, the arrangement being such that the flow in the respective first and second air inlet duct means is divided into substantially equal fluid flow portions for balanced distribution to port and starboard sides of the aircraft.

Preferably, said first or second air inlet duct means includes third air outlet duct means for receiving at least a portion of said air from said first or second air supply source for transmittal to the aircraft cockpit or flight deck the residual mass air flow divided into substantially equal fluid flow portions for balanced distribution to port and starboard sides of the aircraft cabin.

According to a further aspect of the present invention, there is provided an aircraft air-conditioning system, said system including first and second air supply source means for the supply of temperature regulated air, the or each supply source being in communication with fluid flow distribution duct means for balanced distribution of the respective flows to port and starboard sides of the aircraft characterised in that said fluid flow distribution duct means comprises first air inlet duct means for receiving air from said first air supply source, second air inlet duct means for receiving air from said second air inlet supply source, said first and second air inlet duct means including air inlet flow dividing means of substantially equal cross-sectional area and communicating with first and second air outlet duct means providing fluid flow outlet means, the arrangement being such that flow from said first and second air supply source is each divided into substantially equal fluid flow portions for balanced distribution to port and starboard sides of the aircraft and mixing of the resultant flows occurs as the said flow issues from the outlet duct.

One embodiment of the invention will now be described in more detail with reference, by way of example, to the following drawings in which.

Figure 1:
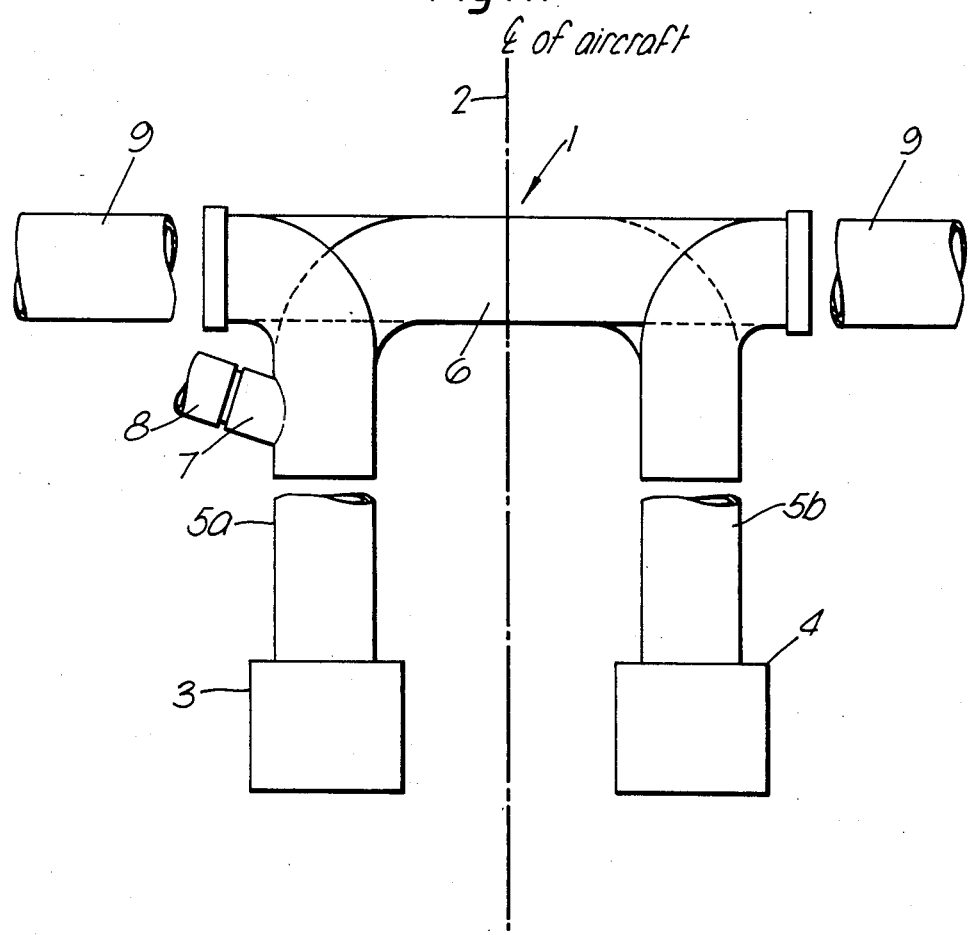
FIG. 1 is a diagrammatic plan view arrangement of a portion of an aircraft air conditioning system.
Figure 2:
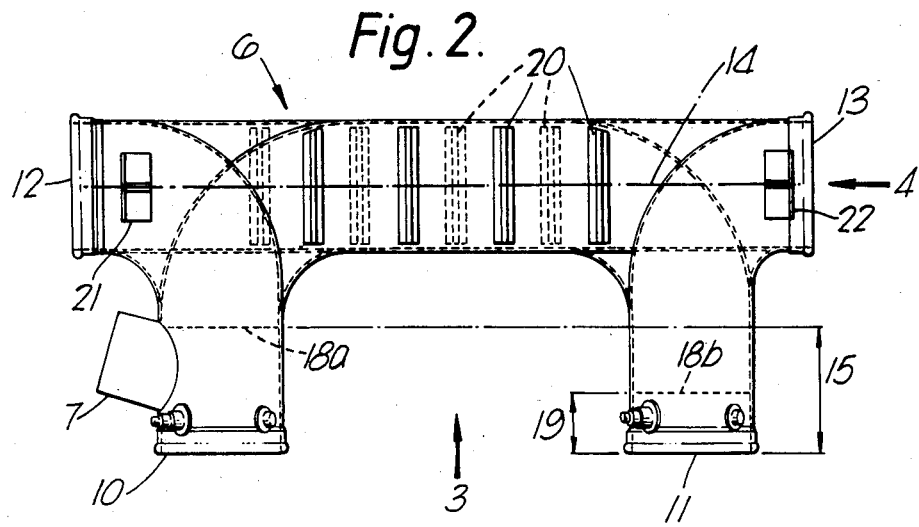
FIG. 2 is a plan view on a distribution duct assembly in accordance with the present invention.
Figure 3:
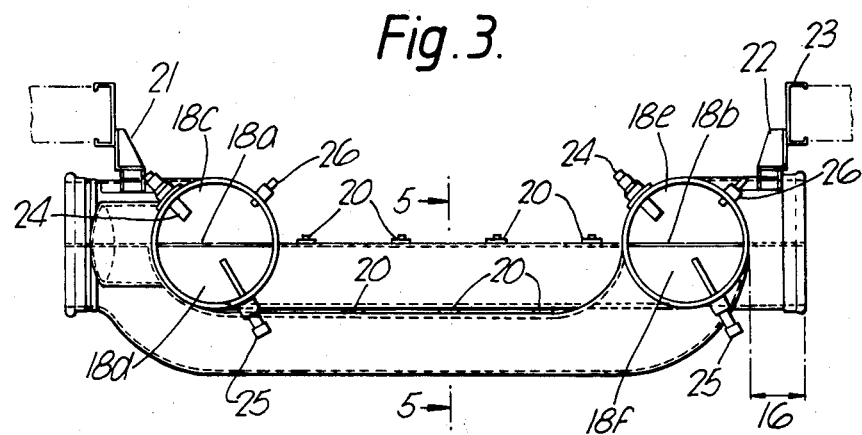
FIG. 3 is an elevation on the distribution duct in direction of arrow 3 in FIG. 2.
Figure 4:
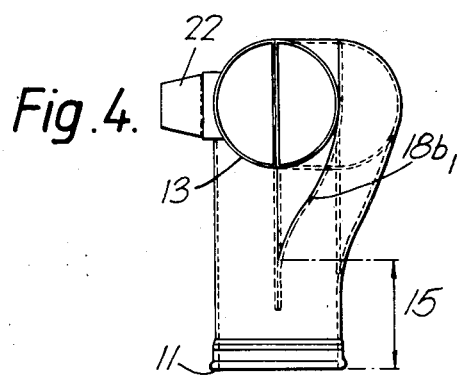
FIG. 4 is an end view on the distribution duct in direction of arrow 4 in FIG. 2.

Referring to the drawings, FIG. 1 illustrates, in diagrammatic plan form a portion of an aircraft air conditioning system 1 according to the present invention in which the system is equally disposed about the centre line 2 of an aircraft. For convenience of description, the top of the page represents 'forward' and the left hand side of the page represents 'port side' in aircraft terms. The system comprises an environmental control system (ECS) unit 3 located on the aircraft port side and a further ECS unit 4 correspondingly located to starboard. Fluid flow ducts 5a and 5b interconnect the ECS units to a distribution duct assembly 6 having a stub duct 7 which provides conditioning air flow to the aircraft cockpit or flight deck via a duct 8 and to the passenger cabin via two riser stub ducts 9 located on port and starboard sides of the cabin. Each ECS unit supplies independent mass flow to the air conditioning system and the temperature range of that flow varies between 3° c. and 70° c. dependent upon requirements. Flow temperatures between port and starboard ducts 5a and 5b may vary as a function of demand since temperature in the port duct 5a is solely determined by cockpit or flight deck requirements whereas that in the starboard duct 5b arises from cabin conditioning requirements. Furthermore, there will be an imbalance between the respective mass flows since a portion of the port duct flow will enter the stub duct 7 leaving only a residual flow. This is undesirable as the mass air flow directed on each side of a passenger cabin should be substantially balanced both in temperature and pressure. To achieve this it is known to incorporate within an air conditioning system cross-over distribution ducting incorporating flow mixing means such as a plenum chamber so that disparate pressures and/or temperatures may be balanced by mixing in, for example, a plenum chamber incorporated within the cross-over duct assembly. This in itself may lead to undesirable pressure losses due to turbulence and drag and the complexity of this duct assembly may be excessively extensive in space and volume terms particularly in aircraft equipment bays where space and ready accessibility is at a premium.

The distribution ducting of the present invention overcomes these shortcomings by means of a novel arrangement whereby the respective flows entering the distribution duct are each divided into separate duct portions of equal cross-sectional area, each duct portion transmitting its respective divided flow portion to either port or starboard outlet duct openings where mixing of the separately issuing flows will occur such that there will be a balanced fluid flow supply in temperature and pressure terms to each side of the cabin, thus minimising the the pressure losses associated with mixing within the distribution duct whilst achieving compact duct proportions. This compact and efficient arrangement is more clearly demonstrated by reference to FIGS. 2 to 5 inclusive which for reasons of clarity illustrates the distribution duct assembly 6 in isolation from the other component parts of the system.

The assembly comprises spaced apart duct inlet portions 10 and 11 and duct outlet portions 12 and 13, the duct outlet portions lying substantially at right angles to the duct inlet portions and disposed about a common axis 14. The duct inlet portions are each of constant circular cross-section over a length 15 and the duct outlet portions each over a length 16. The duct inlet portion 10 includes an outwardly directed outlet duct portion 7. The duct inlet portions further include horizontal diaphragm webs 18a and 18b, each constituting a septum, ie, they divide the inlet duct portion 10 into upper and lower sealed semi-circular ducts 18c and 18d and inlet duct portion 11 into similar semi-circular ducts 18e and 18f. In the case of the duct 10 the web 18a commences immediately beyond the duct portion 7, the web 18b only a distance 19 from the inlet opening of duct 11.

As will be evident from the drawings, immediately beyond the parallel duct portion 15 the semi-circular duct portions divide out and are configured such that the upper duct 18c provides an upper flow passage to the outlet duct portion 12 and the lower duct 18d a lower flow passage to the outlet duct portion 13. Similarly, the upper duct portion 18e provides an upper flow passage to the outlet duct portion 13 and the lower duct a lower flow passage to the outlet duct portion 12. Where the semi-circular disc portions divide out, each includes its own diaphragm web 18a, 18b, over the region of separation.

Figure 5:
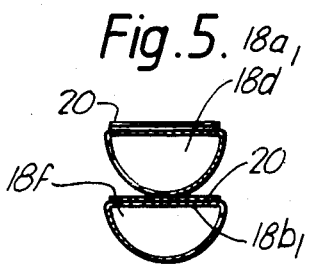
FIG. 5 is a section through the distribution duct in direction of arrow '5—5' in FIG. 3.

Referring to FIG. 5 this cross-over effect is clearly illustrated as the lower semi-circular duct 18d sits in close abuttment on top of the lower semi-circular duct 18f. Both upper surfaces of these ducts further include a number of spaced-apart reinforcing members 20 and the duct outlet portions 12 and 13 include attachment brackets 21 and 22 for attachment of the duct assembly to the aircraft floor support structure 23 shown by way of reference. Inserted within the duct inlet portions 10 and 11 are temperature sensors 24 temperature indicators 25 and over-temperature switch 26.

Although the separation and cross-over of the respective semi-circular duct portions is contained within a compact configuration, the directional change of the component parts is achieved by means of generous radii such that pressure losses are minimal.

I claim:

1. A fluid flow distribution duct for an aircraft air-conditioning system comprising first air inlet duct means for receiving air from a first air supply source, second air inlet duct means for receiving air from a second air supply source, said first and second air inlet duct means including air inlet flow dividing means forming first and second fluid flow pasageway means of substantially equal cross-sectional area for communicating with first and second air outlet duct means, said air inlet flow dividing means comprising a diaphragm web extending longitudinally substantially throughout said distribution duct from said first and second air inlet duct means to said first and second air outlet duct means, the arrangement being such that the flow in the respective first and second air inlet duct means is divided into substantially equal fluid flow portions for balanced distribution to port and starboard sides of the aircraft.

2. A fluid flow distribution duct according to claim 1 in which said duct means are of substantially circular cross-section, and said diaphragm web divided said duct means into substantially semi-circular passageway portions.

3. A fluid flow distribution duct according to claim 1 in which said diaphragm web is substantially horizontally disposed forming upper and lower fluid flow passageway portions.

4. A fluid flow distribution duct according to claim 3 in which said upper and lower duct portions are configured to divide out into separate flow directions, said upper and lower portions of said first air inlet duct means respectively forming an upper fluid flow passageway to the port air outlet duct portion and a lower fluid flow passageway to the starboard air outlet duct portion, said upper and lower portions of said second air inlet duct means respectively forming an upper flow passageway to the starboard air outlet portion and a lower flow passageway to the port air outlet portion.

5. A fluid flow distribution duct according to claim 4 in which the separated upper and lower duct portions each includes its own diaphragm web over at least the region of said separation to maintain separate sealed fluid flow duct portions.

6. An aircraft air conditioning system, said system including first and second air supply source means for the supply of temperature regulated air, the or each supply source being in communication with fluid flow distribution duct means for balanced distribution of the respective flows to port and starboard sides of the aircraft, characterized in that said fluid flow distribution duct means comprises first air inlet duct means for receiving air from a first air supply source, second air inlet duct means for receiving air from second air supply source, said first and second air inlet duct means including air inlet flow dividing means forming first and second fluid flow passageway means of substantially equal cross-sectional area for communicating with first and second air outlet duct means, said air inlet flow dividing means comprising a diaphragm web extending longitudinally substantially throughout said distribution duct from said first and second air inlet duct means to said first and second air outlet duct means for communicating with said aircraft cabin for balanced distribution of conditioning air from said first and second air supply source to port and starboard sides of the aircraft.

* * * * *